No. 611,899. Patented Oct. 4, 1898.
H. A. FREEMAN.
PLUG VALVE.
(Application filed June 1, 1897.)

(No Model.) 2 Sheets—Sheet 1.

WITNESSES:

INVENTOR
Herbert Atherton Freeman
BY
Maynadier & Mitchell,
ATTORNEYS.

THE NORRIS PETERS CO., PHOTO-LITHO., WASHINGTON, D. C.

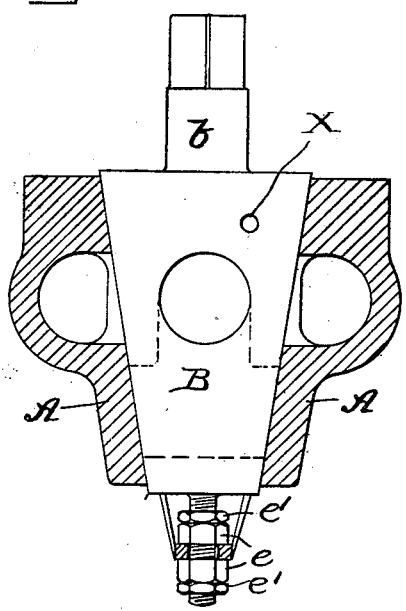
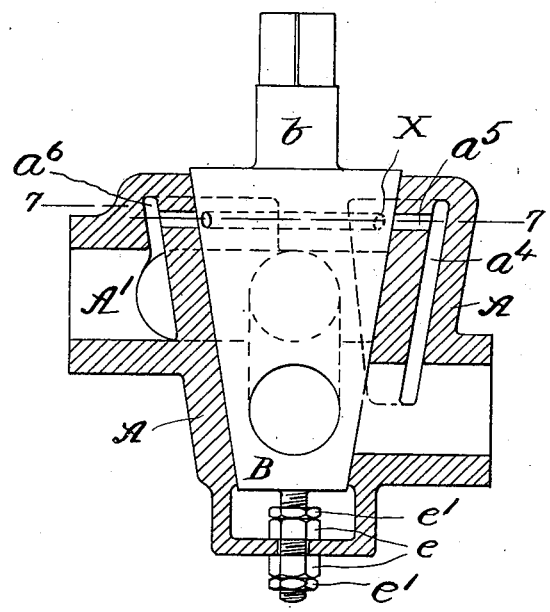
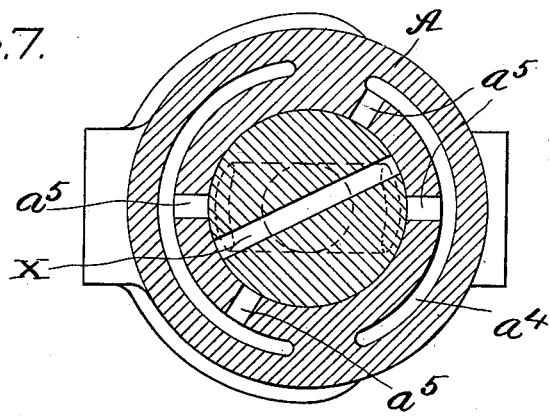

UNITED STATES PATENT OFFICE.

HERBERT ATHERTON FREEMAN, OF PROVIDENCE, RHODE ISLAND.

PLUG-VALVE.

SPECIFICATION forming part of Letters Patent No. 611,899, dated October 4, 1898.

Application filed June 1, 1897. Serial No. 638,873. (No model.)

*To all whom it may concern:*

Be it known that I, HERBERT ATHERTON FREEMAN, of Providence, in the county of Providence and State of Rhode Island, have invented an Improved Plug-Valve, of which the following is a specification, reference being had to the accompanying drawings, in which—

Figure 1:
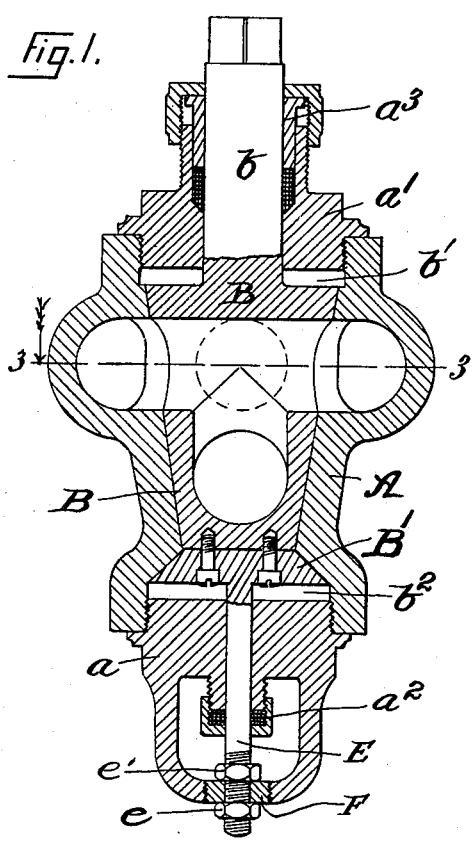
Figure 2:
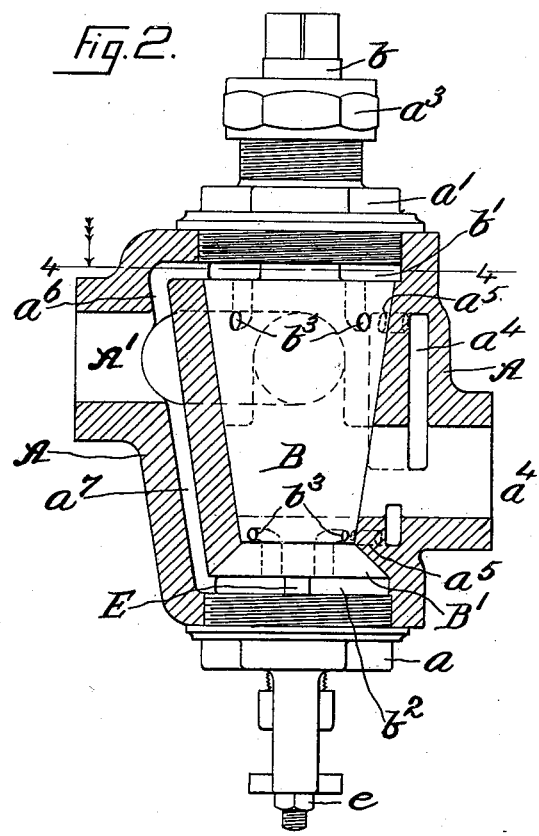
Figure 3:
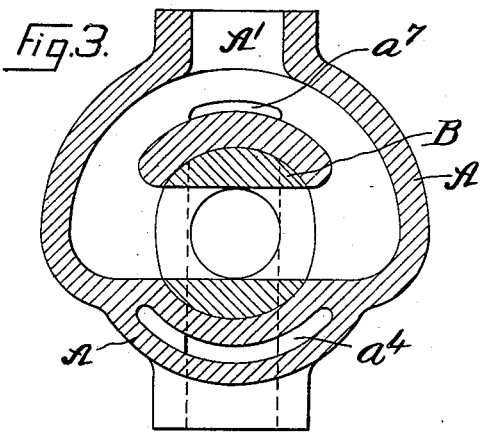
Figure 4:
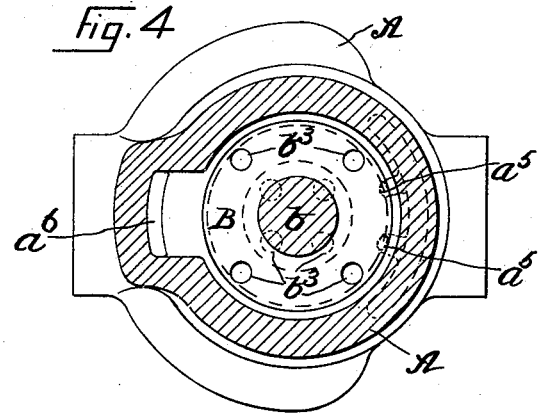

Figure 1 is a central sectional elevation of my improved valve. Fig. 2 is the same taken ninety degrees from the section shown in Fig. 1. Fig. 3 is a section on line 3 3 of Fig. 1. Fig. 4 is a section on line 4 4 of Fig. 2. Fig. 5 is a longitudinal central section of a different form of my valve. Fig. 6 is a longitudinal central section taken ninety degrees from the section shown in Fig. 5. Fig. 7 is a section on line 7 7 of Fig. 6.

The first feature of my invention is a plug-valve consisting of a plug with a passage through it, opening at both ends in the sides of the plug, and a casing with inlet and outlet passages closed by the plug when in one position, but connected by the passage through the plug when the plug is in its other position, and with recesses, one opposite one end of the plug, the other opposite the other end of the plug and open to the inlet-passage, but connected with the outlet-passage by auxiliary passages closed by the plug when in position to stop the flow of fluid through the valve, but opened by turning the plug to allow flow of fluid through the valve. This feature obviates to a great extent the difficulties due to the unequal expansion of the plug and casing when the valve is used with steam or hot fluid, for when the valve is opened by turning the plug the recesses are open to both the inlet and the outlet through auxiliary passages in the casing and the hot fluid flows about the ends of the plug and between the ends of the plug and the casing and through the auxiliary passages in the casing and heats both the plug and the casing equally.

Another feature of my invention to be used when the valve controls hot fluid, as steam, is a chamber in the valve-casing upon the side opposite to the inlet and connected by suitable passages with the inlet and outlet in such a fashion that as the plug is turned the chamber is connected with the inlet and the equal heating of the plug and casing effected.

In the drawings, A is the casing, and B is a plug fitting within that casing. The casing is closed at the bottom by a screw-plug $a$, having an aperture for the passage of a tailpiece E, and at the top by another screw-plug $a'$, having an aperture for the passage of the stem $b$ of the plug B, and suitable packing devices $a^2$ $a^3$ to make a steam-tight joint. The inlet-passage A' forks so that the fluid is conducted to opposite sides of the plug B, the pressure upon one side balancing that upon the other. The plug B has a passage through it, (see Fig. 3,) through which when the plug is turned as in Fig. 3 the fluid flows downward and finally outward. (See Fig. 2.)

Fast to the bottom of casing A is a stirrup F, through an aperture in which a tailpiece E, fast to the bottom of the plug B, passes and is controlled by suitable nuts $e$ and $e'$. By means of this tailpiece any variation in pressure upon the ends of the plug is prevented from in any manner affecting the nice adjustment of the plug in the casing.

To make an accurate balance between the pressures at the ends of the plug, a cone B' is secured to the lower end of the plug, so that the total pressure upward may be made to balance the total pressure downward.

A serious difficulty arises when a plug-valve is used to control steam at high pressure, owing to the unequal heating of the parts and the consequent unequal expansion.

The recesses $b'$ and $b^2$ in the casing adjacent to the ends of the plug obviate this to a material extent; but to obviate it more perfectly I form a chamber or chambers $a^4$ in the casing A. This chamber $a^4$ has passages $a^5$, which are normally closed by plug B.

In the form shown in Figs. 1, 2, 3, and 4 the passage for the steam from the inlet to the chamber $a^4$ is through the recesses $b'$ $b^2$, over and under the plug and through passages $b^3$, through plug B, the ends of which, as the plug is turned, register with passages $a^5$. The main and auxiliary passages both being closed, on opening the valve by turning the plug the passages $b^3$ register with the passages $a^5$, and the passages $a^5$ continue open while the plug is turned in this same direction until the main passage is partly open and are then closed by a further turning of the plug in this same direction. In Fig. 2 the main passage is shown fully open, while the auxiliary passages are out of register and therefore closed. The recesses $b'$ $b^2$ are connected with the inlet by the passages $a^6$ $a^7$, and the area of the recesses $b'$ $b^2$ is so calculated that the pressure upon the ends of the plug may be practically balanced. A great advantage of this construction is that all parts of the plug and casing are properly heated.

In Figs. 5, 6, and 7 I have shown a form of my valve in which the steam passes to chamber $a^4$ through plug B from side to side by passage X.

What I claim as my invention is—

1. In a plug-valve, the combination of a plug with an inlet and outlet passage through it and opening at both ends in the sides of the plug; a casing formed with recesses, one opposite one end of the plug, another opposite the other end of the plug, open to the inlet and connected with the outlet through auxiliary passages, controlled by the plug, substantially as described.

2. In a plug-valve, a casing formed with a chamber, as $a^4$, in the wall of the casing connected with the inlet to the main passage through the valve by auxiliary passages, and with the outlet; and controlled by a plug having a passage through it open to the inlet, which is in register with the passage to the chamber at one position of the plug and closes the passage at another position of the plug substantially as described.

3. In a plug-valve, the combination of a plug with an inlet and outlet passage through it and opening at both ends in the sides of the plug; with a tailpiece fast to the plug; means to adjust the tailpiece and thereby adjust the plug endwise in the casing; and a casing formed with recesses, one opposite one end of the plug, another opposite the other end of the plug, open to the inlet and connected with the outlet through auxiliary passages controlled by the plug, substantially as described.

HERBERT ATHERTON FREEMAN.

Witnesses:
JOHN R. SNOW,
O. R. MITCHELL.